United States Patent
Pinhasi et al.

(10) Patent No.: US 10,946,335 B2
(45) Date of Patent: Mar. 16, 2021

(54) CATALYTIC OXIDATION OF $NO_x/SO_x$ IN FLUE GASES WITH ATMOSPHERIC OXYGEN AS THE OXIDATION REAGENT

(71) Applicant: ARIEL SCIENTIFIC INNOVATIONS LTD., Ariel (IL)

(72) Inventors: Gad A. Pinhasi, Tel Aviv (IL); Tomer Zidki, Hod Hasharon (IL); Haim Cohen, Beit Hashmonai (IL)

(73) Assignee: ARIEL SCIENTIFIC INNOVATIONS LTD., Ariel (IL)

(*) Notice: Subject to any disclaimer, the term of this patent is extended or adjusted under 35 U.S.C. 154(b) by 0 days.

(21) Appl. No.: 16/628,028

(22) PCT Filed: Jul. 18, 2018

(86) PCT No.: PCT/IL2018/050793
§ 371 (c)(1),
(2) Date: Jan. 1, 2020

(87) PCT Pub. No.: WO2019/016808
PCT Pub. Date: Jan. 24, 2019

(65) Prior Publication Data
US 2020/0215483 A1 Jul. 9, 2020

Related U.S. Application Data

(60) Provisional application No. 62/534,805, filed on Jul. 20, 2017.

(51) Int. Cl.
| | | |
|---|---|---|
| C05C 1/00 | (2006.01) | |
| C05C 3/00 | (2006.01) | |
| B01D 53/78 | (2006.01) | |
| B01D 53/80 | (2006.01) | |
| B01D 53/86 | (2006.01) | |

(52) U.S. Cl.
CPC ......... *B01D 53/8637* (2013.01); *B01D 53/78* (2013.01); *B01D 53/80* (2013.01); *B01D 53/8653* (2013.01); *B01D 53/8693* (2013.01); *C05C 1/00* (2013.01); *C05C 3/00* (2013.01); *B01D 2255/30* (2013.01); *B01D 2258/0283* (2013.01)

(58) Field of Classification Search
CPC ........ B01D 53/8693; B01D 2258/0283; B01D 2255/30; B01D 53/78; B01D 53/8637; B01D 53/80; B01D 53/86; B01D 53/8653; B01D 2257/302; B01D 2257/404; B01D 2251/102; B01D 53/60; C05D 9/00; C05G 1/00; C05C 1/00; C05C 3/00
See application file for complete search history.

(56) References Cited

U.S. PATENT DOCUMENTS

| | | | | |
|---|---|---|---|---|
| 4,101,634 A * | 7/1978 | Ploeg | ..................... | B01D 53/60 423/239.1 |
| 4,400,355 A * | 8/1983 | Donnelly | ............. | B01D 53/504 422/170 |
| 4,853,193 A * | 8/1989 | Cahn | ..................... | B01D 53/60 423/235 |
| 5,120,508 A * | 6/1992 | Jones | ..................... | B01D 53/60 422/171 |
| 5,695,616 A * | 12/1997 | Helfritch | ................. | C01C 1/185 204/157.3 |
| 6,881,243 B1 | 4/2005 | Khitrik et al. | | |
| 8,173,090 B2 * | 5/2012 | Petrocelli | ................. | F23J 15/02 423/243.08 |
| 8,282,901 B2 * | 10/2012 | Petrocelli | ............. | B01D 53/002 423/242.1 |
| 2012/0237407 A1 * | 9/2012 | White | ...................... | F23C 9/08 422/160 |

FOREIGN PATENT DOCUMENTS

| | | |
|---|---|---|
| CN | 1544126 A | 11/2004 |
| CN | 101934191 A | 1/2011 |
| CN | 102658021 A | 9/2012 |
| CN | 103230733 A | 8/2013 |

OTHER PUBLICATIONS

International Search Report of PCT/IL2018/050793 dated Nov. 8, 2018. 3 pages.
Kasper et al; "Control of Nitrogen Oxide Emissions by Hydrogen Peroxide-Enhanced Gas-Phase Oxidation of Nitric Oxide" Journal of the Air & Waste Management Association, 46:2, pp. 127-133. (1996).
Stamate et al; "Investigation of NOx Reduction by Low Temperature Oxidation Using Ozone Produced by Dielectric Barrier Discharge" The Japan Society of Applied Physics 52, pp. 05EE 01-05. (2013).
Stamate et al; "NOx reduction by ozone injection and direct plasma treatment" ESCAMPIG XXI, Viana do Castelo, Portugal, Jul. 10-14, 2012.
Written Opinion of PCT/IL2018/050793 dated Nov. 8, 2018. 5 pages.

* cited by examiner

*Primary Examiner* — Timothy C Vanoy
(74) *Attorney, Agent, or Firm* — The Roy Gross Law Firm, LLC; Roy Gross

(57) ABSTRACT

A $NO_x$ and $SO_x$ oxidation with atmospheric oxygen to remove $NO_x$ and $SO_x$ from flue gases. The combined system for catalytic oxidation and wet-scrubbing of $NO_x$ and $SO_x$ from a flue gas and manufacturing fertilizers includes: an air separation unit for separating atmospheric oxygen from air and producing an air stream enriched with atmospheric oxygen, an adsorption and oxidation reactor containing an oxidation catalyst and carrying out the catalytic oxidation of $NO_x$ and $SO_x$ by said oxygen to yield nitric and sulphuric acids, a separator and reactor control unit for separation of products and liquids and controlling the reaction; and a vessel containing ammonia streaming said ammonia into the reactor or into the control unit to react with the nitric and sulphuric acids and to yield the fertilizers.

20 Claims, 14 Drawing Sheets

CATALYTIC OXIDATION OF $NO_x/SO_x$ IN FLUE GASES WITH ATMOSPHERIC OXYGEN AS THE OXIDATION REAGENT

TECHNICAL FIELD

The present invention relates to a method and system for combined catalytic oxidation of nitrogen oxides ($NO_x$) and sulphur oxides ($SO_x$) in flue gases. In particular, the present invention relates to use of atmospheric oxygen as the oxidation reagent in the combined catalytic oxidation process of nitrogen oxides ($NO_x$) and sulphur oxides ($SO_x$) in flue gases.

BACKGROUND

Nitrogen oxides ($NO_x$) and sulphur oxides ($SO_x$) are air pollutants emitted in large quantities from nitrogen- and sulphur-contaminated fossil fuel industrial plants, such as power plants. Two of the most common nitrogen oxides are nitric oxide (NO) and nitrogen dioxide ($NO_2$). Nitric oxide (NO) is a colourless to brown gas at room temperature with a sharp and sweet smell. Nitrogen dioxide ($NO_2$) is a reddish-brown gas at temperatures above 20° C. and becomes colourless to brown liquid, with a strong and harsh odour on cooling. It is highly reactive and exists in equilibrium with the colourless gas dinitrogen tetroxide ($N_2O_4$): $2NO_2 \rightleftharpoons N_2O_4$. Unlike $NO_2$, $N_2O_4$ is diamagnetic since it has no unpaired electrons. $N_2O_4$ can be crystallised as a white solid having a melting point–11.2° C. The liquid $N_2O_4$ is also colourless but can appear as a brownish yellow liquid due to the presence of $NO_2$ according to the above equilibrium. The equilibrium is exothermic and characterised by $\Delta H=-57.23$ kJ/mol. Thus, higher temperatures push the equilibrium towards $NO_2$, while at lower temperatures, dinitrogen tetroxide ($N_2O_4$) predominates. Inevitably, some $N_2O_4$ is a component of $NO_2$-containing smog. Nitrous oxide ($N_2O$) is a well-known greenhouse gas that contributes to climate change. Sulphur dioxide ($SO_2$) is the predominant form of the sulphur oxides found in the lower atmosphere. It is a colourless gas that can be detected by taste and smell in the range of 1,000 to 3,000 micrograms per cubic meter ($\mu g/m^3$).

$NO_x$ and $SO_x$ are released into the air not only from power plants but from any motor vehicle exhaust or the burning of coal, oil, diesel fuel, and natural gas, especially from electric power plants. They are also released during industrial processes such as welding, electroplating, engraving, and dynamite blasting. They may also be produced by cigarette smoking.

Nitrogen oxides, when combined with volatile organic compounds, form ground-level ozone, or smog. $NO_x$ and $SO_x$ react with oxygen and undergo reactions with water vapours in the atmosphere to yield acid rains. These oxides are the most common pollutants found in the air around the world. Exposure to high industrial levels of $NO_x$ and $SO_x$ can cause collapse, rapid burning and swelling of tissues in the throat and upper respiratory tract, difficult breathing, throat spasms, and fluid build-up in the lungs. It can interfere with the blood's ability to carry oxygen through the body, causing headache, fatigue, dizziness and eventually death. Therefore, in accordance with stringent environmental restrictions regarding pollutant emissions the removal of these pollutants from industrial gas streams is very important and follows.

Currently, in most industrial processes, $NO_x$ and $SO_x$ are treated separately. Emissions of $SO_x$ are being reduced significantly and completely removed from flue gases by wet scrubbing technology using a slurry of alkaline sorbent, usually limestone or lime, or seawater to scrub gases. Sulphur dioxide is an acid gas, and, therefore, the typical sorbent slurries or other materials used to remove the $SO_2$ from the flue gases are alkaline. In some designs, the product of the $SO_2$ wet scrubbing, calcium sulphite ($CaSO_3$), is further oxidised to produce marketable gypsum ($CaSO_4 \cdot 2H_2O$). This technique is also known as forced oxidation, flue gas desulfurization (FGD) or fluidised gypsum desulfurization. It is the most effective technology for $SO_x$ removal.

Although the flue gas desulfurization process achieves relatively high $SO_x$ removal efficiency, it is not effective in $NO_x$ removal. This is because nitric oxide (NO) gas, which comprises more than 90% of $NO_x$ in the flue gas, is quite insoluble in water. The oxidation of nitrogen to its higher valence states yields $NO_x$ soluble in water. When this is carried out, a gas absorber becomes effective. In general, an oxidiser must be added to the scrubbing system in order to convert insoluble NO gas (5.6 mg per 100 ml of water at room temperature) to soluble $NO_2$ as a prerequisite step.

Thus, absorption of $NO_x$ gases is probably the most complex when compared with other absorption operations because of nitric oxide low solubility. Therefore, the control of $NO_x$ is mostly achieved by using chemical reduction technique, for example, selective catalytic reduction (SCR). The yields of nitrogen oxides reduction to nitrogen in the SCR are typically high, but this technique is extremely expensive.

Kasper et al (1996) in "*Control of Nitrogen Oxide Emissions by Hydrogen Peroxide-Enhanced Gas-Phase Oxidation Of Nitric Oxide*", Journal of the Air and Waste Management Association 46(2), pages 127-133, described that the removal of $NO_x$ in wet scrubbers may be greatly enhanced by gas-phase oxidation of water-insoluble NO gas to water-soluble $NO_2$, $HNO_2$, and $HNO_3$ (the acid gases are much more soluble in water than nitric oxide). The gas-phase oxidation may be accomplished by injecting liquid hydrogen peroxide into the flue gas, so that $H_2O_2$ vaporises and dissociates into hydroxyl radicals. The oxidised $NO_x$ species may then be easily removed by caustic water scrubbing.

Oxidants that have been injected into the gas flow are ozone, ionised oxygen or hydrogen peroxide. Non-thermal plasma generates oxygen ions within the air flow to achieve this. Other oxidants have to be injected and mixed in the flow. The kinetic problem of fast oxidation of nitrogen and sulphur oxides, NO to $NO_2$ and $SO_2$ to $SO_3$, during the short residence time in the exhaust stack has been taken care by using very strong oxidants like ozone or hydrogen peroxide. Stamate et al (2013) in "*Investigation of $NO_x$ Reduction by Low Temperature Oxidation Using Ozone Produced by Dielectric Barrier Discharge*", Japanese Journal of Applied Physics 52(5S2), 05EE03, suggested that in order to enhance the wet scrubber operation, ozone may be used for $NO_x$ gases oxidation. Stamate and Stalewski (2012) in "*$NO_x$ reduction by ozone injection and direct plasma treatment*", Proceedings of ESCAMPIG XXI, Viana do Castelo, Portugal, Jul. 10-14, 2012, compared the $NO_x$ reduction by ozone injection with direct plasma treatment. Hutson et al. (2008) in "*Simultaneous Removal of $SO_2$, $NO_x$, and Hg from Coal Flue Gas Using a $NaClO_2$-Enhanced Wet Scrubber*", Industrial and Engineering Chemistry Research (I&EC) 47(16), pages 5825-5831, taught using sodium chlorite $NaClO_2$ as an oxidiser for removal of $NO_x$ gases.

Thus, the aforementioned oxidation techniques intentionally raise the valence of nitrogen in a nitrogen oxide to allow water to absorb the oxidised nitrogen oxide. This is accomplished either by using a catalyst, injecting hydrogen peroxide, creating ozone within the gas flow, or injecting ozone into the gas flow. Non-thermal plasma, when used without a reducing agent, can be used to oxidise $NO_x$ as well. A wet scrubber must be added to the process in order to absorb $N_2O_5$ emissions into the atmosphere. Any resultant nitric acid may then be neutralised by a scrubber liquid and then sold (usually as a calcium or ammonia salt to produce fertilisers). Alternatively, it may be collected as nitric acid for sales.

However, the above processes using hydrogen peroxide ($H_2O_2$) and ozone ($O_3$) require expensive and corrosion-resistant systems to be installed in the wet scrubber units, which significantly increase the production costs of both hydrogen peroxide and ozone (which are expensive reagents themselves) used for oxidation of $NO_x$ and $SO_x$ gases. This, in turn, requires the introduction of the expensive production units which also use high voltage and high safety standards. Therefore, the oxidation methods mentioned above for wet scrubbing technology are extremely expensive. In addition, both $H_2O_2$ and $O_3$ are reactive and corrosive, which creates several maintenance problems. Therefore, despite recent developments in this field, there still remains a need for a process, which would be economical (cheap), safe and easily up-scaled for industrial needs, and which would effectively remove simultaneously both $NO_x$ and $SO_x$ from the flue gases in the wide range of industrial applications.

SUMMARY

The aforementioned problems in removal of both $NO_x$ and $SO_x$ simultaneously from the flue gases using expensive oxidation reagents, such as $H_2O_2$ and ozone, may be solved by using atmospheric oxygen instead as an oxidation reagent. In one embodiment, a combined system for catalytic oxidation and wet-scrubbing of simultaneously both nitrogen oxides ($NO_x$) and sulphur oxides ($SO_x$) from a flue gas and manufacturing fertilisers, comprises:

a) An air separation unit for separating atmospheric oxygen from air and thereby producing an air stream substantially enriched with atmospheric oxygen for oxidation of $NO_x$ and $SO_x$;

b) An adsorption and oxidation reactor containing a dry oxidation catalyst or an adsorbing dispersion containing the oxidation catalyst, and designed to receive the air stream substantially enriched with atmospheric oxygen and a flue gas stream containing $NO_x$ and $SO_x$, to adsorb said streamed gases, and then to carry out the catalytic oxidation of said $NO_x$ and $SO_x$ by said oxygen to yield nitric and sulphuric acids;

c) A separator and reactor control unit for separation of products and liquids and controlling said catalytic oxidation and wet-scrubbing; and d) A vessel containing gas or liquid ammonia, connected to said adsorption and oxidation reactor or to said separator and reactor control unit, and having an inlet streaming said ammonia into the adsorption and oxidation reactor or into the separator and reactor control unit to react with the nitric and sulphuric acids and to yield ammonium nitrate and ammonium sulphate, thereby wet-scrubbing $NO_x$ and $SO_x$ from the flue gas and producing the fertilisers.

The adsorption and oxidation reactor may be dry and packed with inert solids, such as ceramic beads, promoting a better contact between said oxygen stream and said flue gas stream, or wet containing a liquid circulating inside. In a specific embodiment, the adsorption and oxidation reactor is selected from a bubble column, packed bed and spray tower equipped with spray means. These spray means can spray into the spray tower either: (i) water or mother liquor on the dry oxidation catalyst particles, thereby forming floating drops of the adsorbing dispersion directly inside the spray tower, or (ii) the adsorbing dispersion prepared in advance and containing the oxidation catalyst. The spray tower may be a wet scrubber comprising an empty cylindrical vessel made of steel or plastic, and inlets for gas streams. The spray means may comprise one or more spray nozzles arrayed within the spray tower along the flue gas flow path and configured to spray said water, mother liquor or adsorbing dispersion into the vessel. These spray nozzles are equipped with a demister for mist removal.

In a further embodiment, the oxidation catalyst may comprise the mixture of an aqueous solution of a metal salt precursor with silica gel particles and used for catalysing the oxidation reaction of $NO_x$ and $SO_x$ in the flue gas. The metal salt precursor is a water-soluble inorganic salt of a transition metal selected from cobalt (Co), nickel (Ni), manganese (Mn), iron (Fe), copper (Cu) and chromium (Cr). In a specific embodiment, the metal salt precursor is cobalt chloride ($CoCl_2$). The oxidation catalyst may also comprise an aqueous suspension of cobalt oxide/hydroxide particles supported on silica gel particles.

In yet further embodiment, the separator and reactor control unit comprises at least one of the following processing units: a phase separator, crossflow separator, mixer-settler, decanter, tricanter or filter. It may further comprise sensors for measuring and controlling temperature and pH of the processed liquids. When the adsorbing dispersion is an oil-water emulsion, the separator and reactor control unit comprises an oil-water phase separator configured to receive said oil-water emulsion from the adsorption and oxidation reactor and to separate the oil (organic phase) from water (aqueous phase). The organic phase of the oil-water emulsion of this embodiment may contain elemental sulphur in saturated heavy mineral oil. Sulphur is capable of catalysing the reaction of the nitric and sulphuric acids with ammonia to yield the ammonium nitrate and ammonium sulphate as fertiliser products dissolved in the aqueous phase. The organic phase may further comprise activators, such as dichlorobenzene, Disperbyk®-108, decabromodiphenyl ether or diphenyl ether, added to the sulphur oil solution to increase the solubility of the elemental sulphur.

In another embodiment, the system of the present invention further comprises a crystallisation vessel connected to the processing unit and configured to receive from the processing unit an aqueous solution containing the dissolved ammonium nitrate and ammonium sulphate products. The crystallisation vessel is capable of crystallising and precipitating the ammonium nitrate and ammonium sulphate from the aqueous solution.

In still another embodiment, the system of the present invention further comprises a separate oxidation chamber connected to the air separation unit and configured to receive the air stream substantially enriched with atmospheric oxygen and a stream of the flue gas containing $NO_x$ and $SO_x$. This oxidation chamber is filled with the oxidation catalyst and is capable of catalysing the oxidation of $NO_x$ and $SO_x$ by said atmospheric oxygen. It may be dry and packed with inert solids, such as ceramic beads, promoting a better contact between said oxygen stream and said flue gas stream, or wet containing a liquid circulating inside.

In a further embodiment, a method for removing simultaneously nitrogen and sulphur oxides from a flue gas containing said oxides comprises the steps of:

I. Separating atmospheric oxygen from air, thereby producing an air stream substantially enriched with atmospheric oxygen for oxidation of $NO_x$ and $SO_x$;
II. Catalytic oxidation of the $NO_x$ and $SO_x$ contained in the flue gas by the atmospheric oxygen in said air stream, thereby producing the oxidised $NO_x$ and $SO_x$ streamed with the flue gas; and
III. Wet-scrubbing of the oxidised $NO_x$ and $SO_x$ streamed in the flue gas with an adsorbing dispersion comprising a solid oxidation catalyst suspended in water, an oxidation catalyst soluble in organic solvent and emulsified in water, or a combination thereof, thereby removing the $NO_x$ and $SO_x$ from the flue gas.

The above process further comprises the step of contacting the oxidised $NO_x$ and $SO_x$ dissolved in a liquid phase of said adsorbing dispersion, with ammonia to produce ammonium nitrate $NH_4NO_3$ and ammonium sulphate $(NH_4)_2SO_4$ used as fertilisers. The obtained product is further subjected to separation and crystallisation. In yet further embodiment, the above process comprises the steps of crystallisation, precipitation and collection of the $NH_4NO_3$ and $(NH_4)_2SO_4$ products from the aqueous solution, and recycling of water from mother liquor left after precipitation of the ammonium nitrate and ammonium sulphate products.

In a specific embodiment, the above process is carried out at the temperature of 50-90° C. and pH 4-7. This pH is maintained with ammonium hydroxide injection in order to keep the reaction going and not to create the alkaline solution, from which ammonia gas ($NH_3$) may evolve.

Various embodiments of the invention may allow various benefits, and may be used in conjunction with various applications. The details of one or more embodiments are set forth in the accompanying figures and the description below. Other features, objects and advantages of the described techniques will be apparent from the description and drawings and from the claims.

BRIEF DESCRIPTION OF THE DRAWINGS

The present invention will be understood and appreciated more fully from the following detailed description taken in conjunction with the appended figures. Various exemplary embodiments are well illustrated in the accompanying figures with the intent that these examples not be restrictive. Of the accompanying figures.

DETAILED DESCRIPTION

Figure 1:
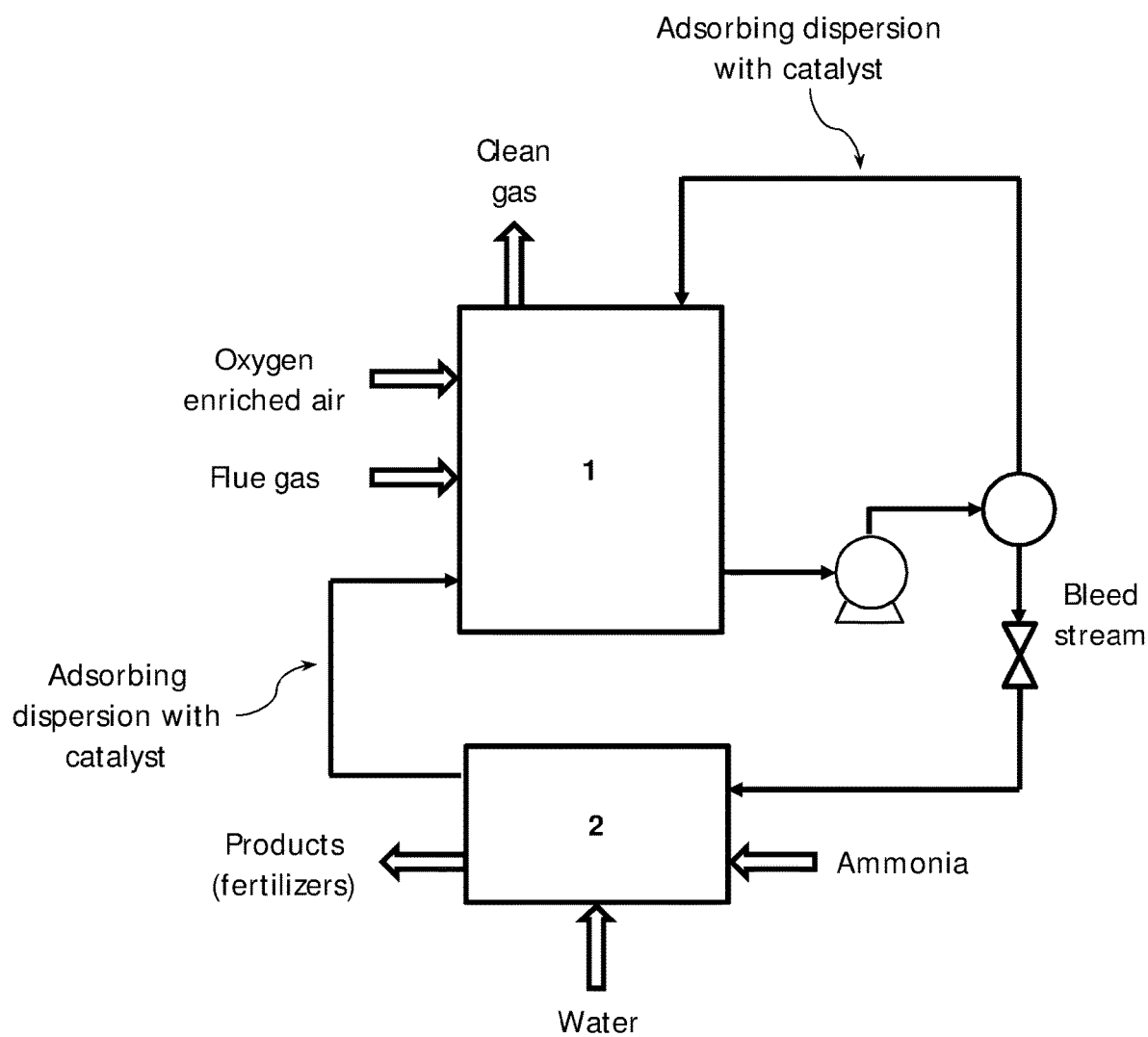
FIG. 1 shows the operational diagram of the combined system of the present invention for catalytic oxidation and wet-scrubbing of nitrogen oxides ($NO_x$) and sulphur oxides ($SO_x$) from flue gases.

In the following description, various aspects of the invention will be described. For purposes of explanation, specific aspects and details are set forth in order to provide a thorough understanding of the invention. However, it will also be apparent to one skilled in the art that the invention may be practiced without the specific details presented herein. Furthermore, well-known features may be omitted or simplified in order not to obscure the invention.

The terminology used herein is for describing particular embodiments only and is not intended to be limiting of the invention. The terms "comprising" and "comprises", used in the claims, should not be interpreted as being restricted to the means listed thereafter; they do not exclude other elements or steps. They need to be interpreted as specifying the presence of the stated features, integers, steps and/or components as referred to, but does not preclude the presence and/or addition of one or more other features, integers, steps or components, or groups thereof. Thus, the scope of the expression "a device comprising x and z" should not be limited to devices consisting only of components x and z. Also, the scope of the expression "a method comprising the steps x and z" should not be limited to methods consisting only of these steps.

Unless specifically stated, as used herein, the term "about" is understood as within a range of normal tolerance in the art, for example within two standard deviations of the mean. In one embodiment, the term "about" means within 10% of the reported numerical value of the number with which it is being used, preferably within 5% of the reported numerical value. For example, the term "about" can be immediately understood as within 10%, 9%, 8%, 7%, 6%, 5%, 4%, 3%, 2%, 1%, 0.5%, 0.1%, 0.05%, or 0.01% of the stated value. In other embodiments, the term "about" can mean a higher tolerance of variation depending on for instance the experimental technique used. Said variations of a specified value are understood by the skilled person and are within the context of the present invention. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges, for example from 1-3, from 2-4, and from 3-5, as well as 1, 2, 3, 4, 5, or 6, individually. This same principle applies to ranges reciting only one numerical value as a minimum or a maximum. Unless otherwise clear from context, all numerical values provided herein are modified by the term "about". Other similar terms, such as "substantially", "generally", "up to" and the like are to be construed as modifying a term or value such that it is not an absolute. Such terms will be defined by the circumstances and the terms that they modify as those terms are understood by those of skilled in the art. This includes, at very least, the degree of expected experimental error, technical error and instrumental error for a given experiment, technique or an instrument used to measure a value.

As used herein, the term "and/or" includes any and all combinations of one or more of the associated listed items. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached to", "connected to", "coupled with", "contacting", etc., another element, it can be directly on, attached to, connected to, coupled with or contacting the other element or intervening elements may also be present. In contrast, when an element is referred to as being, for example, "directly on", "directly attached to", "directly connected to", "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealised or overly formal sense unless expressly so defined herein. Well-known functions or constructions may not be described in detail for brevity and/or clarity.

The deficiencies of the prior art as discussed above are alleviated by the systems and processes described in the present application, wherein nitrogen oxides ($NO_x$) and sulphur oxides ($SO_x$) of the emitted flue gases are simultaneously oxidised by atmospheric oxygen in the presence of a catalyst followed by wet scrubbing in the presence of ammonia to yield the corresponding ammonium salts used as fertilisers for agriculture.

As mentioned above, the main problem associated with the existing methods for removal of $NO_x$ and $SO_x$ is the very low solubility of the nitric oxide gas in water. The oxidation of nitrogen to its higher valence states yields $NO_x$ soluble in water. Therefore, the removal of $NO_x$ in wet scrubbers may be greatly enhanced by gas-phase oxidation of water-insoluble NO gas to water-soluble $NO_2$, $HNO_2$, and $HNO_3$ (the acid gases are much more soluble in water than nitric oxide). The gas-phase oxidation may be accomplished by injecting liquid hydrogen peroxide ($H_2O_2$) into the flue gas, so that hydrogen peroxide vaporises and dissociates into hydroxyl radicals. Ozone ($O_3$) can also be used for the oxidation purposes. The oxidised $NO_x$ species may then be easily removed by caustic water scrubbing.

However, the use of either $O_3$ or $H_2O_2$ as oxidising reagents for $NO_x$ and $SO_x$ creates a series of safety and maintenance problems, because these oxidising reagents are relatively expensive, very reactive and corrosive. As a result, their use in wet scrubbing of $NO_x$ and $SO_x$ significantly increases the operational and maintaining costs of the process and system.

Instead of using $O_3$ or $H_2O_2$ for oxidation, the present inventors suggested using atmospheric oxygen ($O_2$), which is abundance in the air, considerably reduces both the operational and maintenance cost of the wet scrubber and produces safer and less hazardous working environment. The use of the atmospheric $O_2$ obviates the need for using the cumbersome and expensive $H_2O_2/O_3$ oxidation systems and allows combining the catalytic oxidation and wet-scrubbing of the flue gas in one-step process.

Reference is now made to FIG. 1 showing the operational diagram of the combined system of the present invention for catalytic oxidation and wet-scrubbing of simultaneously both nitrogen oxides ($NO_x$) and sulphur oxides ($SO_x$) in their gas mixture from flue gases and manufacturing fertilisers from them. This is essentially a one-stage system of the present invention comprising the following components:

a) An air separation unit (not shown in the figure) for separating atmospheric oxygen from air and thereby producing an air stream substantially enriched with atmospheric oxygen for oxidation of $NO_x$ and $SO_x$;

b) An adsorption and oxidation reactor (1) containing an adsorbing dispersion of oxidation catalyst for receiving the air stream substantially enriched with atmospheric oxygen and a flue gas stream containing $NO_x$ and $SO_x$, adsorbing said streamed gases into said adsorbing dispersion, and then carrying out the oxidation reaction of said $NO_x$ and $SO_x$; and c) A separator and reactor control unit (2) for separation of products and liquids and controlling the entire process.

The air separation unit, which is not shown in this figure, is capable of separating atmospheric oxygen from air, thereby producing the air stream substantially enriched with the atmospheric oxygen for oxidation of the $NO_x$ and $SO_x$ gases. Commercially available air separation units can be used in the system of the embodiment. Most of them are based on fractional distillation. However, cryogenic air separation units or separation units based on membrane, pressure swing adsorption and vacuum pressure swing adsorption can also be used to produce the air stream of the highly enriched atmospheric oxygen from ordinary air.

The system of the present invention may contain two types of the oxidation catalyst for facilitating the oxidation reaction of $NO_x$ and $SO_x$. The first catalyst is used in the form of solid catalyst particles suspended in water, while the second catalyst is soluble in organic solvent and used in the oil-water emulsion. The term "adsorbing dispersion" used herein below thus defines both the aqueous suspension of the oxidation catalyst particles (suspended in water) and the oil-water emulsion of the oxidation catalyst (soluble in organic solvent). Depending on the type of the oxidation catalyst used or their combination, there are several possible system configurations, which are described in the present application:

(A) One-stage configuration based on the oxidation catalyst particles suspended in water;

(B) Two-stage configuration based on the oxidation catalyst particles suspended in water;

(C) One-stage configuration based on the combination of two catalysts: the first oxidation catalyst suspended in water and the oil-water emulsion of the second oxidation catalyst (soluble in organic solvent); and (D) Two-stage configuration based on the combination of two catalysts: the first oxidation catalyst suspended in water and the oil-water emulsion of the second oxidation catalyst (soluble in organic solvent).

The configurations (C) and (D) differ from the configurations (A) and (B), respectively, in the design of their separator and reactor control unit (2), which should be modified for separating organic and aqueous phases.

Figure 2:
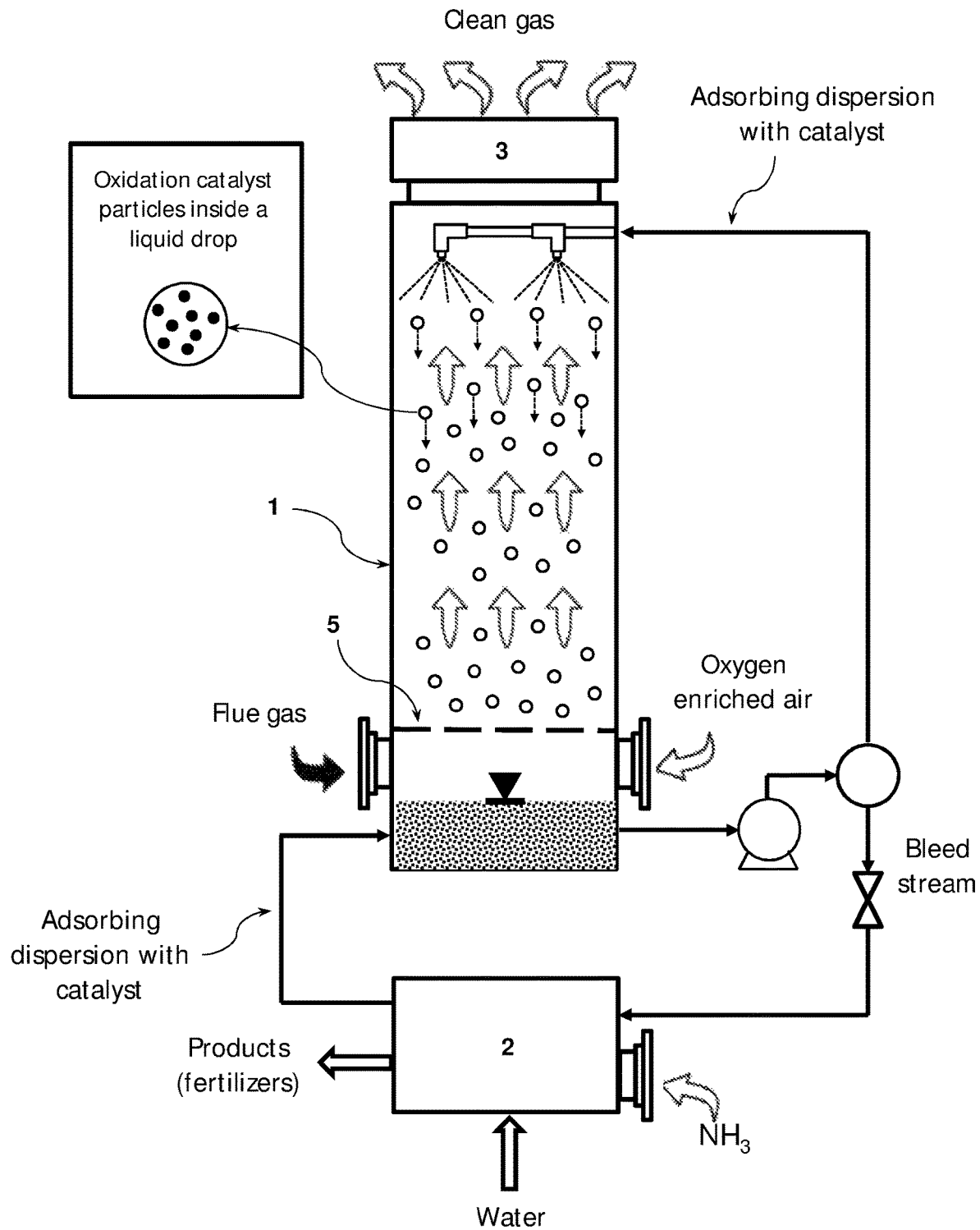
FIG. 2 schematically shows the one-stage system of the present embodiment, wherein the adsorption and oxidation reactor (1) is a spray tower.
Figure 3A:
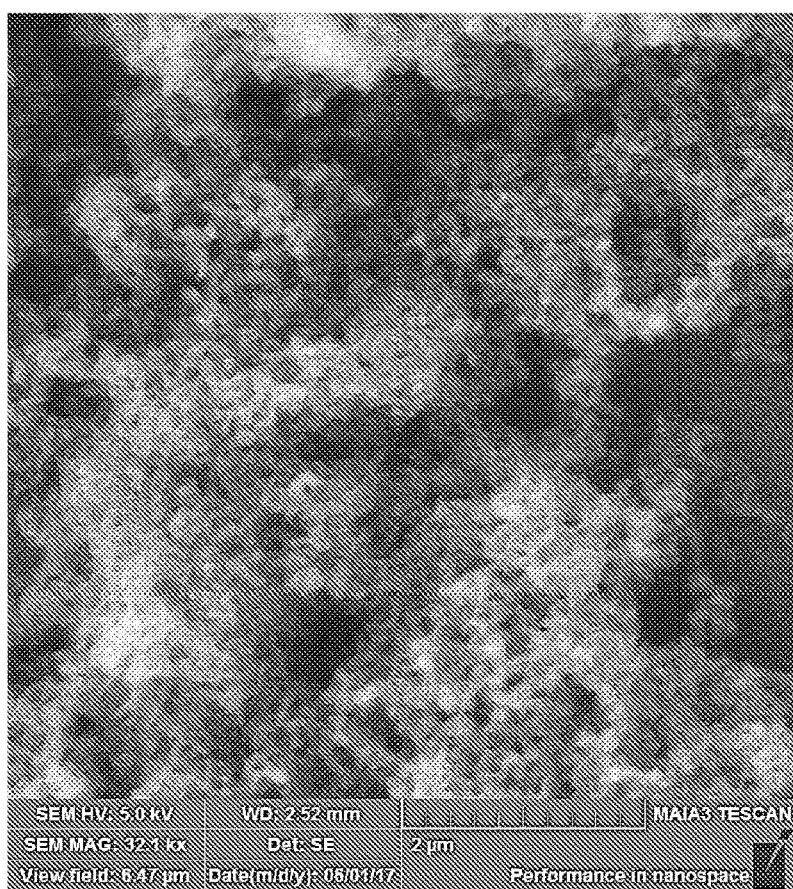
FIGS. 3a-3h show the scanning electron microscope (SEM) images of the obtained silica particles coated with cobalt hydrous oxide.
Figure 3B:
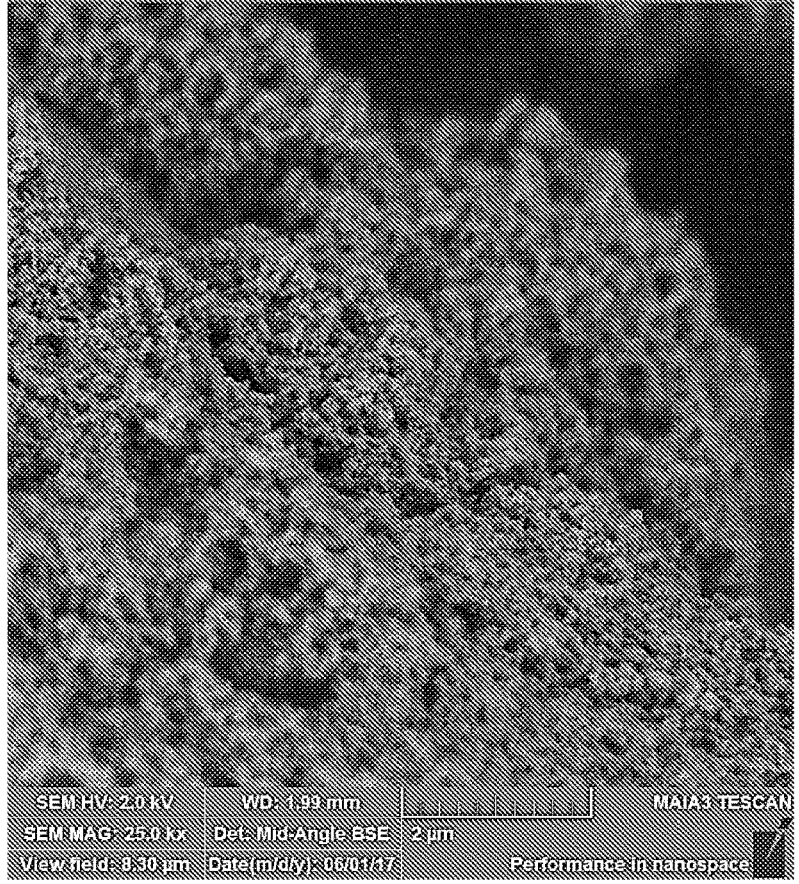
Figure 3C:
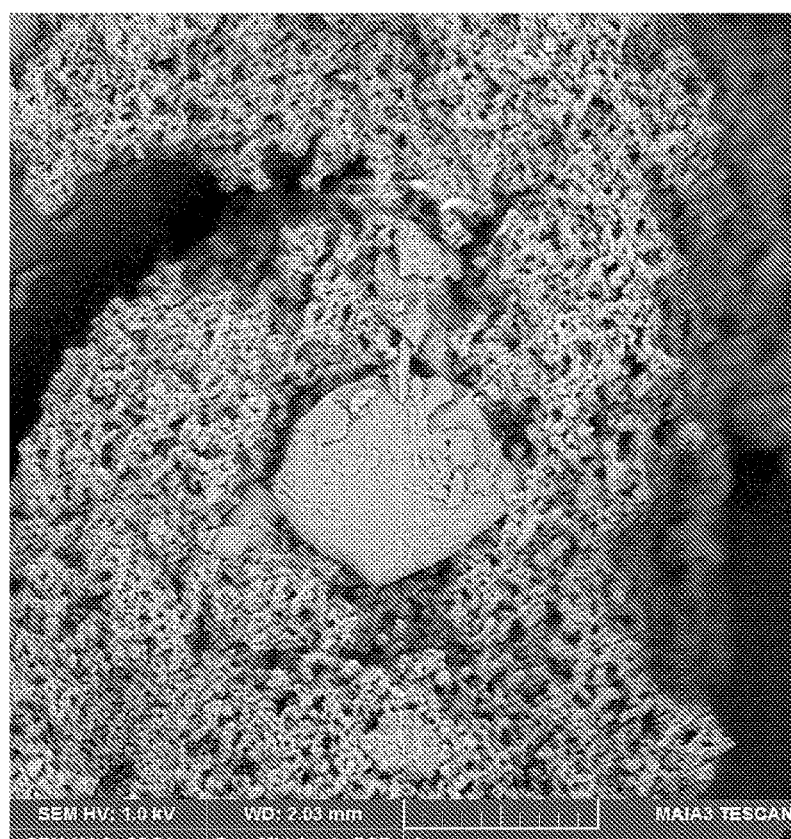
Figure 3D:
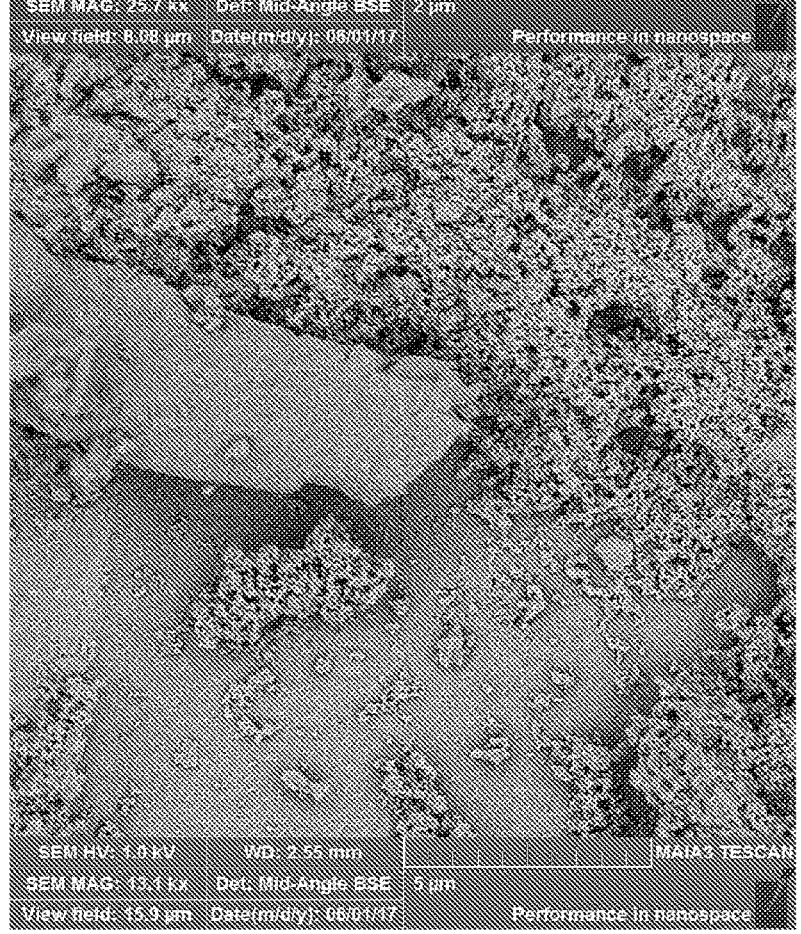
Figure 3E:
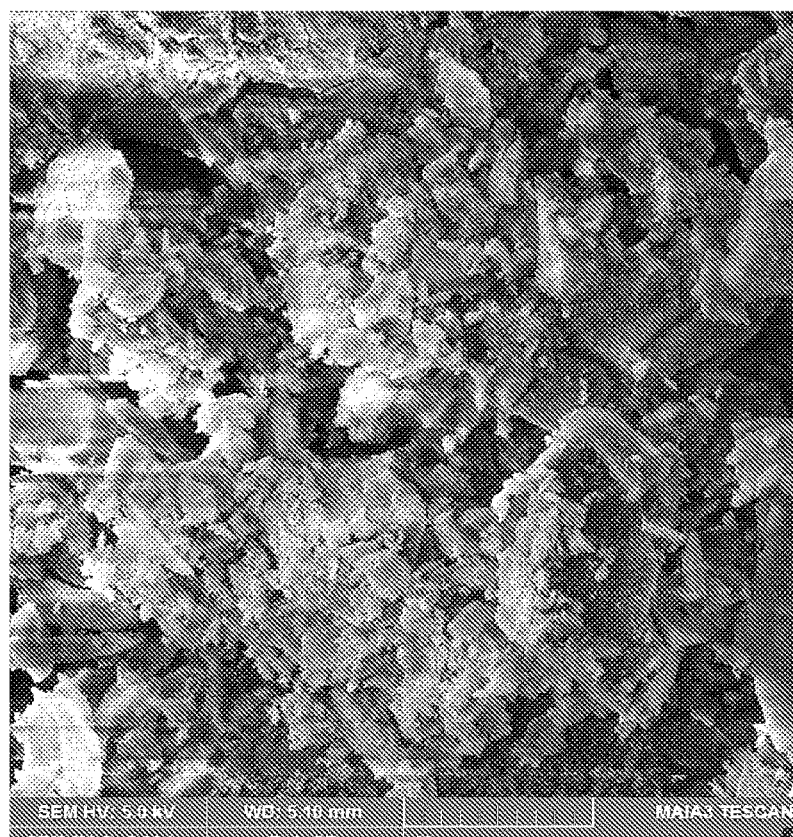
Figure 3F:
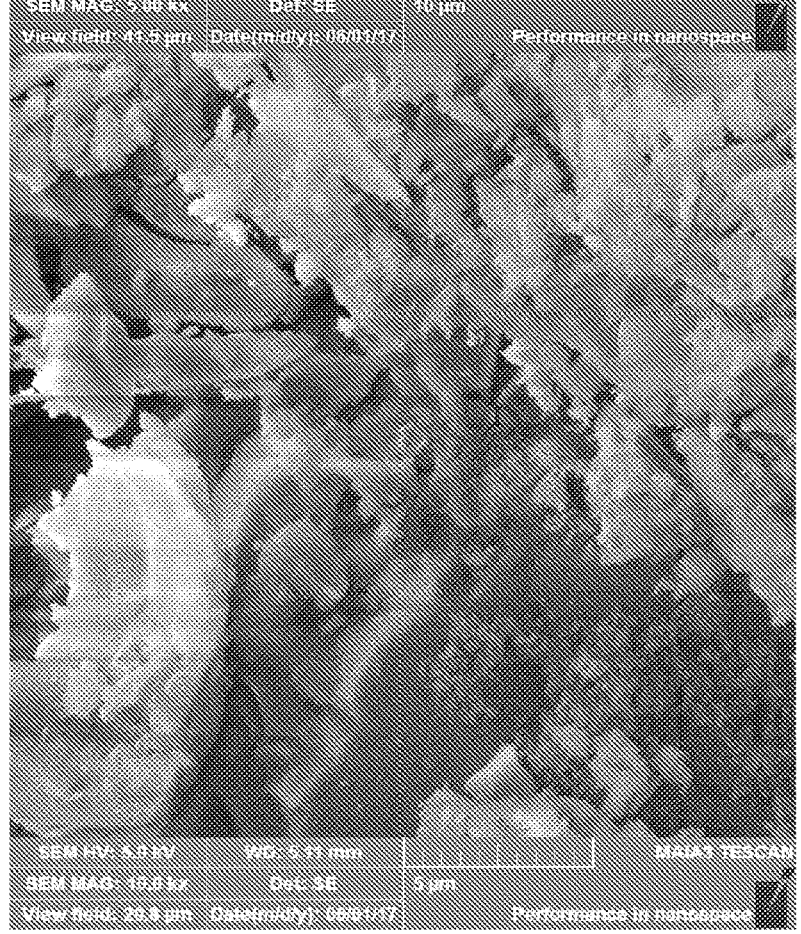
Figures 3G, 3H:
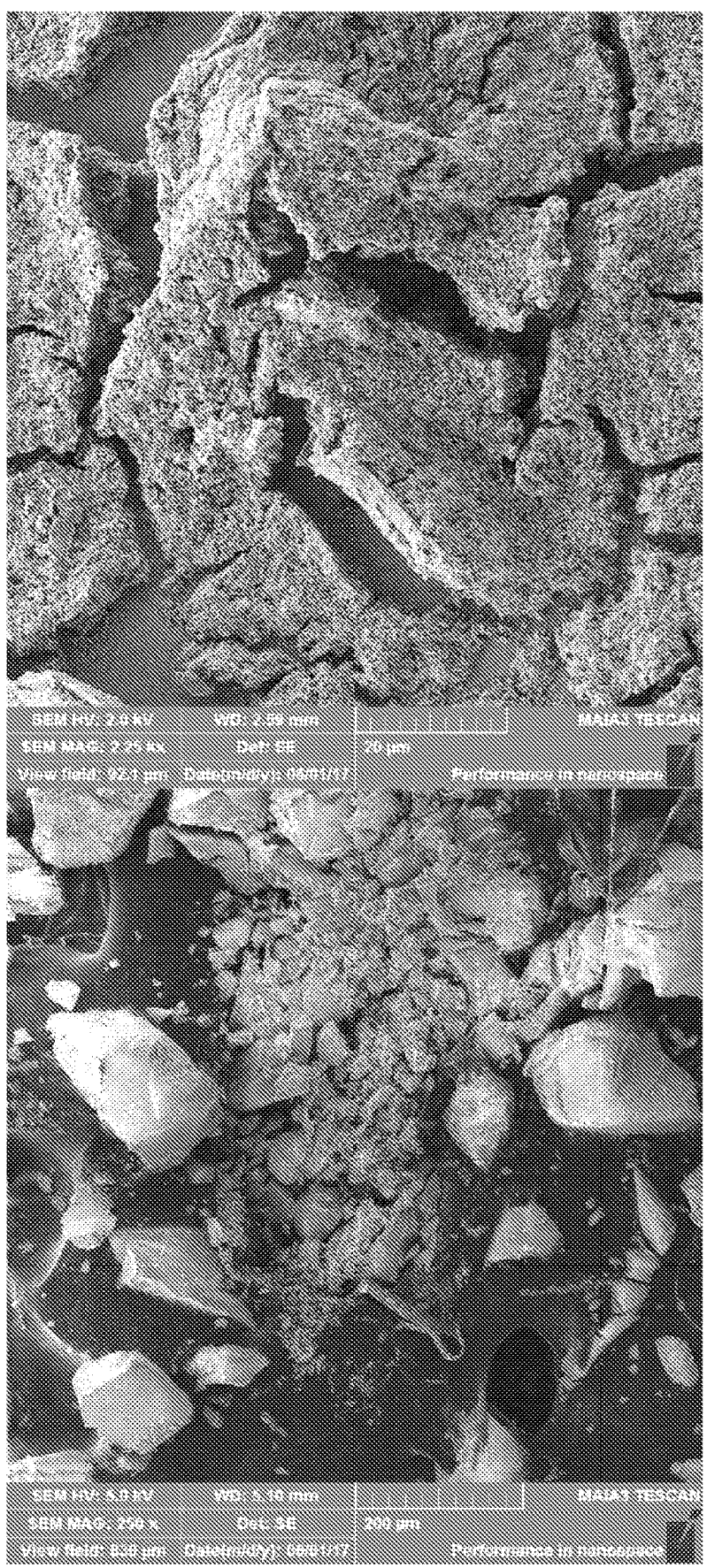

The above configurations may also contain different types of the adsorption and oxidation reactor (1), which are selected from a bubble column, packed bed and spray tower. Reference is now made to FIG. 2 showing the one-stage system of the present invention, wherein the adsorption and oxidation reactor (1) constitutes a spray tower. The spray tower can spray the adsorbing dispersion containing the oxidation catalyst. The oxidation catalyst, in this case, may be either the solid catalyst suspended in water, the catalyst soluble in organic solvent and emulsified in water, or combination thereof. The spray tower is a type of a wet scrubber used to achieve mass and heat transfer between a continuous gas phase and a dispersed liquid phase. The spray tower may consist essentially of an empty cylindrical vessel made of steel or plastic and nozzles that spray the liquid into this vessel. The spray means may include one or more spray nozzles arrayed within the spray tower along the flue gas flow path. The spray nozzles may be equipped with a demister (3) for mist removal. In addition, a bottom tray (5) is used for forming a uniform gas flow in the tower cross section.

The oxidation catalyst particles insoluble in water are produced by mixing the aqueous solution of a metal salt precursor with silica gel particles. The metal salt precursor of the embodiment may be any available water-soluble inorganic salt of a transition metal, such as cobalt (Co), nickel (Ni), manganese (Mn), iron (Fe), copper (Cu) or chromium (Cr). In a specific embodiment, the metal salt precursor used for the preparation of the oxidation catalyst is cobalt chloride ($CoCl_2$). For example, the oxidation catalyst may be prepared by mixing 600 µM of the $CoCl_2$ aqueous solution (cobalt precursor) with silica gel powder or silica particles suspension, such as colloidal silica "Snow-Tex ST-40", which is supplied by Nissan Chemicals Inc. This process involves adsorption of Co(II) on silica particles with the formation of the 1-2 nm Co(II) hydroxide clusters.

The obtained oxidation catalyst particles may be stabilised by the negative charges of about 260 —Si—O— surface groups per particle with sodium ions $Na^+$ as the counter ions. The pH of the obtained suspension may be adjusted with a basic solution, for example, sodium hydroxide solution, to pH 7 or higher in order to hydrolyse cobalt on the silica particles (so called, "pH-jump"). The hydrolysis is carried out under vigorous stirring at room temperature. A Y-mixer with 20 mL/s flow rate may be employed to provide uniform conditions for cobalt hydrolysis and adsorption on silica. The resultant suspension has a blue colour.

FIGS. 3a-3h show the SEM images of the obtained silica particles coated with cobalt hydrous oxide. The obtained $Co(OH)_2/SiO_2$ catalyst is a high surface-area, heterogeneous, yet suspendable in water catalyst that demonstrates both high selectivity and catalytic activity in the oxidation of the $NO_x$ and $SO_x$ gases by oxygen. The catalyst also shows high stability as no deactivation or precipitation of cobalt is observed upon multiple cycling of cobalt ions through their higher oxidation state that must be involved in the oxidation process.

Thus, the oxidation catalyst provides a system which does not necessitate the utilisation of the expensive $O_3$ and $H_2O_2$ that are usually used. The Co(II) oxidation state changes to Co(III) after its oxidation with oxygen. This oxidised cobalt is capable of oxidising NO and $SO_2$ in the flue gas, thereby being reduced back to Co(II). The oxidation column is therefore filled with an aqueous suspension of cobalt oxide/hydroxide particles supported on silica gel particles, thereby catalysing the oxidation of $NO_x$ and $SO_x$. When NO or $SO_2$, which is contained in the flue gas, is being absorbed on these catalyst particles, the irreversible oxidation reaction occurs at a finite but high speed according to the following equations:

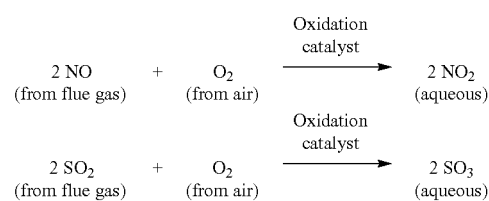

The above oxidation reactions are considered to be globally of second order with respect to the reactants. Quite obviously an increase in the oxygen concentration (enrichment of the air stream with oxygen) enhances the rate of these oxidation reactions As shown in FIG. 2, the oxygen-enriched air stream and the flue gas enter the spray tower from the bottom and flow counter current to the adsorbing dispersion, which is introduced at the top of the spray tower, sprayed downward the tower and adsorbs the oxidised $NO_x$ and $SO_x$ gases. The spray tower is often packed with some inert solids, such as ceramic beads, in order to promote better contact between the two streams (oxygen and flue gas).

Separation of the oxidised $NO_x$ and $SO_x$, for instance, $NO_2$ and $SO_3$, from the reactant NO and $SO_2$ contained in the flue gas is achieved simply because of the solubility of the former in water. The pH of the resulted suspension decreases due to the formation of nitric and sulfuric acids via the following reactions:

$$2NO_2 + H_2O \rightarrow HNO_3 + HNO_2$$

$$SO_3 + H_2O \rightarrow H_2SO_4$$

As mentioned in the background, $NO_2$ exists in equilibrium with the colourless gas dinitrogen tetroxide ($N_2O_4$): $2NO_2 \rightleftharpoons N_2O_4$. Also, the relatively unstable dinitrogen trioxide ($N_2O_3$) may be formed according to the following equilibrium: $NO + NO_2 \rightleftharpoons N_2O_3$. In the presence of water, NO and $NO_2$ may also exist in the equilibrium with nitrous acid: $NO + NO_2 + H_2O \rightleftharpoons 2HNO_2$.

The concentrations of the various nitrogen oxides species present during the entire adsorption-oxidation process (NO, $NO_2$, $N_2O_3$, $N_2O_4$) are not independent though, which complicates the whole process. When absorbed into water $NO_2$, $N_2O_3$ and $N_2O_4$ undergo relatively fast hydrolysis, thereby producing nitric acid ($HNO_3$) and nitrous acid ($HNO_2$), the latter being decomposed in nitrous oxide NO, which desorbs to the gas phase according to the following reaction: $3HNO_2 \rightleftharpoons HNO_3 + H_2O + 2NO$. The pH during the entire process must be maintained in the range of 4-7 with ammonium hydroxide injection in order to keep the reaction going and not to create the alkaline solution, from which ammonia gas ($NH_3$) may evolve. The suspension colour may change from pink (acidic) to blue (alkaline) depending on the pH of the solution. The operating temperature is 60-70° C. due to the hot flue gas coming from the furnace.

The term "mother liquor" used herein below defines the liquid portion of the circulating adsorbing dispersion that contains almost no suspended or dissolved oxidation catalyst or crystallisation product. It is either recycled into the spray tower together with the oxidation catalyst particles in a form of the aqueous suspension, or sprayed from the nozzles on the dry oxidation catalyst particles floating in the spray tower, thereby forming the aqueous suspension directly inside the reactor. The mother liquor is also the liquid left over after crystallisation of the fertiliser products and collected by filtering off the crystals.

As schematically shown in FIG. 2, the adsorbing dispersion is filtered and recycled continuously in the system. The spray tower is connected to a vessel (not shown in the figure) containing either gas or liquid ammonia, which is streamed into a phase separator inside the separator and reactor control unit (2) in order to react with the oxidised $NO_x$ and $SO_x$ species, thereby producing fertilisers (ammonium nitrate and ammonium sulphate) according to the following equation:

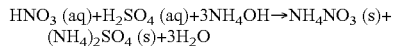

When the ammonia-containing vessel contains ammonia in a gas phase, the vessel is pressurised (the pressure vessel). Alternatively, ammonia which is streamed into the system, may be in a liquid form (in its aqueous solution), and then the vessel is a regular container for liquids with a pump pumping the aqueous ammonia solution into the phase of the separator and reactor control unit (2). The obtained solid products (fertilisers) are then separated from the liquids and collected. The system of the present invention may further comprise sensors for measuring and controlling pH and temperature of the liquid. The mother liquor may be further recycled by transferring it for feeding a new portion of the suspension in the spray tower. The adsorbing dispersion sprayed in the spray tower may contain the filtered aqueous solution that is recycled from the dry oxidation chamber and contains the dissolved $NH_4NO_3$ and $(NH_4)_2SO_4$ fertiliser products and ammonium hydroxide.

Another oxidation catalyst that may be used in the system of the present invention is elemental sulphur capable of catalysing the $NO_x$ and $SO_x$ oxidation reaction. In that case, the adsorbing dispersion must contain an oil-water emulsion of sulphur, wherein the organic phase of the emulsion comprises elemental sulphur in saturated heavy mineral oil. Thus, in a particular embodiment, the sprayed adsorbing dispersion may further contain an organic phase comprising elemental sulphur in saturated heavy mineral oil, which acts as an additional oxidation catalyst in the $NO_x$ and $SO_x$ oxidation process.

In other words, when the adsorbing dispersion is an oil-water emulsion of the oxidation catalyst, the mother liquor may be an emulsion containing a filtered aqueous solution recycled from the spray tower and an organic phase comprising elemental sulphur in saturated heavy mineral oil. Said sulphur is capable of catalysing the oxidation reaction of the $NO_x$ and $SO_x$ species.

The sulphur catalyst for the above reaction is prepared by addition of the elemental sulphur into heavy mineral oil at a temperature higher than the melting point of sulphur (119° C.). Dissolution of sulphur in the heavy mineral oil is therefore carried out at elevated temperatures in the range 120-160° C. and results in partial formation of the S—O bonds (sulfoxides), which are efficient catalysts in oxidation of (nitrite) $NO_2^-$ and (sulphite) $SO_3^{2-}$ into nitrate ($NO_3^-$) and sulphate ($SO_4^{2-}$), respectively. The formed water-soluble $NO_3^-$ and $SO_4^{2-}$ ions then undergo a phase transfer diffusing from the organic phase to the aqueous phase (the latter is in contact with the droplets of the mineral oil catalyst) in the spray tower.

Thus, the obtained sulphur oil solution containing the mineral oil, in which the elemental sulphur is dissolved up to saturation, creates an emulsion when mixed with the aqueous solution streamed from the oxidation column. The resultant oil/water emulsion is used along with the aqueous suspension of the oxidation catalyst particles. The organic phase may further comprise various activators that may be added to the oil sulphur solution to increase the solubility of the elemental sulphur, such as diphenyl ether, dichlorobenzene, decabromo-diphenyl ether or Disperbyk®-108. These activators are added to the sulphur oil solution to increase the solubility of the elemental sulphur. The sulfoxide appears to be an active species which plays a major role in the oxidation processes. In addition, the catalyst oil phase which is a bad solvent for ionic species may play a role in the efficient migration of the ammonium salts (nitrate and sulphate), their separation from the products upon saturation in the aqueous phase, followed by precipitation as solid salts which are used as fertilisers.

Figure 4A:
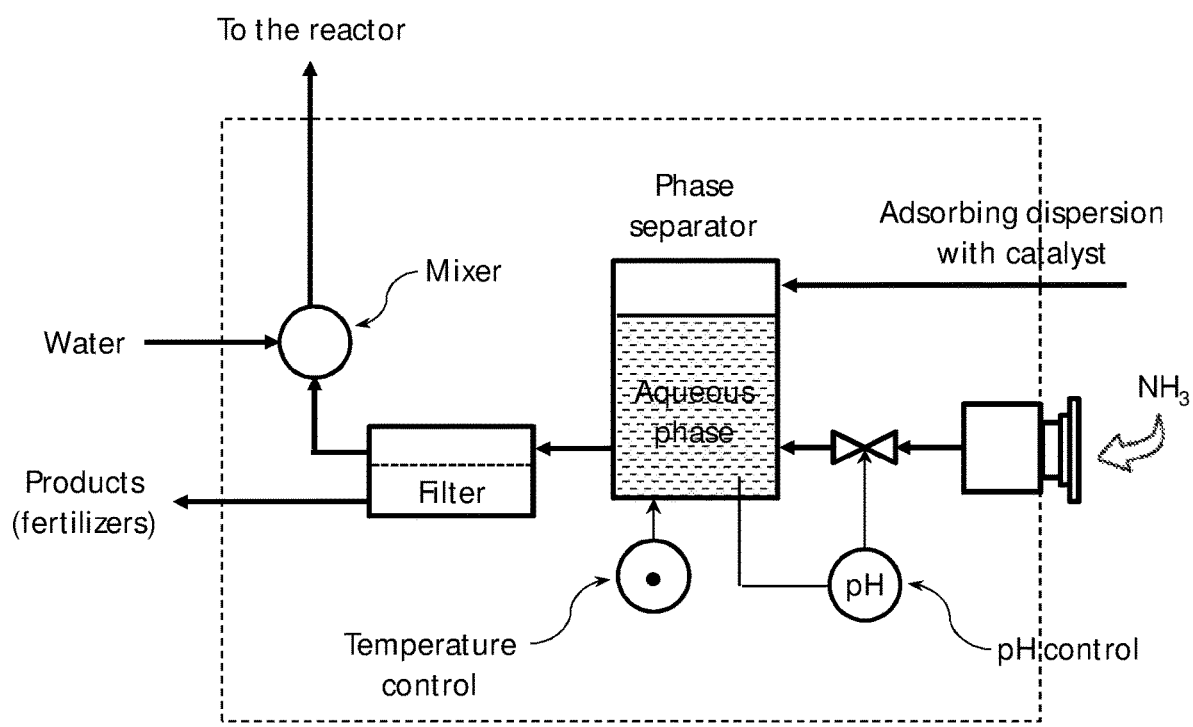
FIG. 4a schematically shows the separator and reactor control unit (2) for the system shown in FIGS. 1 and 2 of the present invention.
Figure 4B:
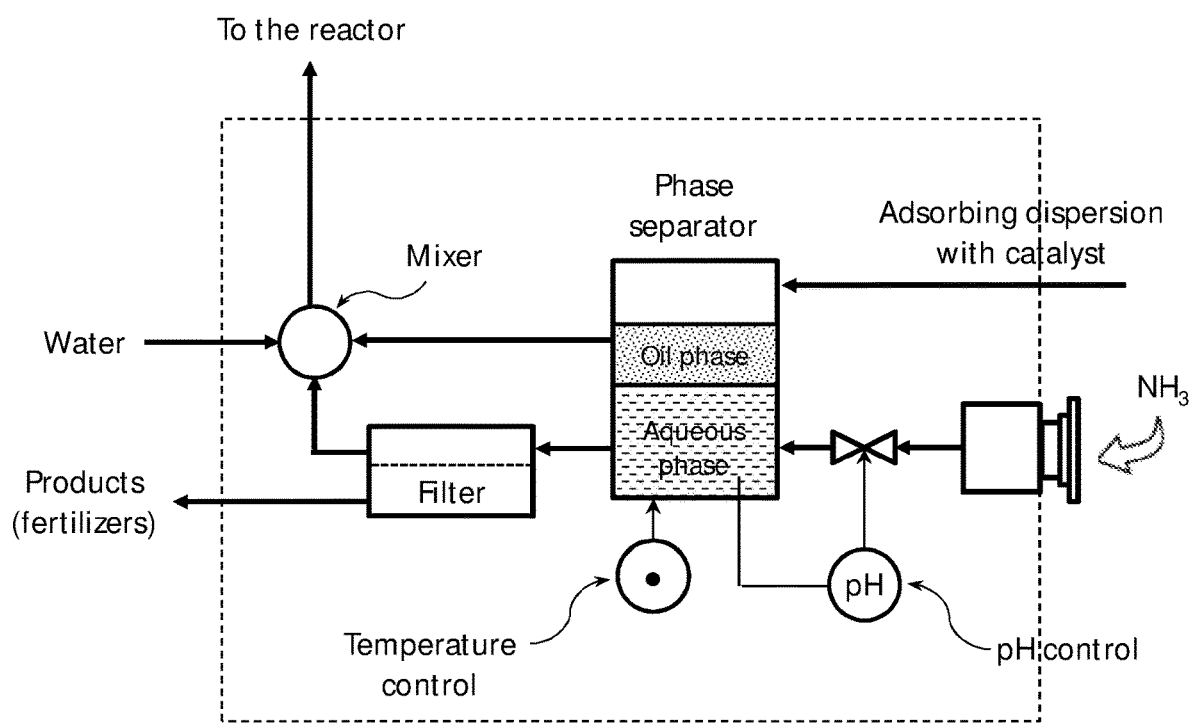
FIG. 4b schematically shows the separator and reactor control unit (2) for the system where the adsorbing dispersion contains the oil-water emulsion of the catalyst.

Reference is now made to FIG. 4a schematically showing the separator and reactor control unit (2) for the system shown in FIGS. 1 and 2 of the present embodiment. The structure of this unit depends on whether the adsorbing dispersion constitutes only an aqueous suspension of the oxidation catalyst particles, or the suspension also contains an oil-water emulsion of the emulsified oxidation catalyst. FIG. 4b schematically shows the separator and reactor control unit (2) for the system where the adsorbing dispersion contains the oil-water emulsion of the catalyst. The stream of the oil-water emulsion obtained in the wet scrubbing process is transferred to the oil-water separator inside the separator and reactor control unit (2) for separating gross amounts of oil from water and suspended solids. Any available oil-water separator may be used for this purpose, for example, an API separator, gravity plate separator, centrifugal separator, hydrocyclone separator, electrochemical separator or downhole separator. The separated oil is then returned to the spray tower, while the aqueous phase containing dissolved $NH_4NO_3$ and $(NH_4)_2SO_4$ products is transferred to a crystallisation vessel (not shown in the figure) for further crystallisation and precipitation of $NH_4NO_3$ and $(NH_4)_2SO_4$ from the aqueous solution. The mother liquor is then recycled back into the spray tower.

In general, the separator and reactor control unit (2) is used for handling liquid streams transferred from the adsorption and oxidation reactor (1), including a full stream or portion of it, which is called "bleed stream". In the unit (2), the streamed adsorbing dispersion with the dissolved and oxidised $NO_x$ and $SO_x$ is allowed to contact with the injected stream of ammonia to produce the ammonium nitrate and ammonium sulphate fertiliser products. This reaction is carried out inside the unit (2), followed by separation of the products from the circulating stream. The unit (2) therefore comprises at least one of the following processing sub-units: a phase separator, crossflow separator, mixer-settler, decanter, tricanter or filter. When the adsorbing dispersion contains an oil-water emulsion, the unit (2) comprises an oil-water phase separator configured to receive said oil-water emulsion from the adsorption and oxidation reactor and separate the oil (organic phase) from water (aqueous phase) containing salts and suspended solid catalyst particles. This separation can be done using gravity or centrifugal separators.

The separator and reactor control unit (2) may further comprise sensors for measuring and controlling temperature and pH of the processed liquids. The flow, temperature and pH feedback control is performed by measuring the present values and relating them to the reference values using various actuators, such as an electric heater (for temperature control), ammonia dosing pump (for pH control), and controlled main pump (for flow control).

Separation of the suspended catalyst particles from the aqueous solution or mother liquor can be carried out by membrane filtration, for example using a crossflow filtration sub-unit. For the filtration process and for the inlet stream, additional pressure pumps may be needed. The aqueous solution containing the dissolved ammonium nitrate and ammonium sulphate products is removed from the system, while the mother liquor, suspended catalyst particles, the organic phase and added water are mixed and steamed back to the adsorption and oxidation reactor (1) at the bottom or through the nozzles. This way, the adsorbing dispersion containing the catalyst is allowed to circulate inside the system, while the fertiliser products are continuously removed from the system.

Figure 5:
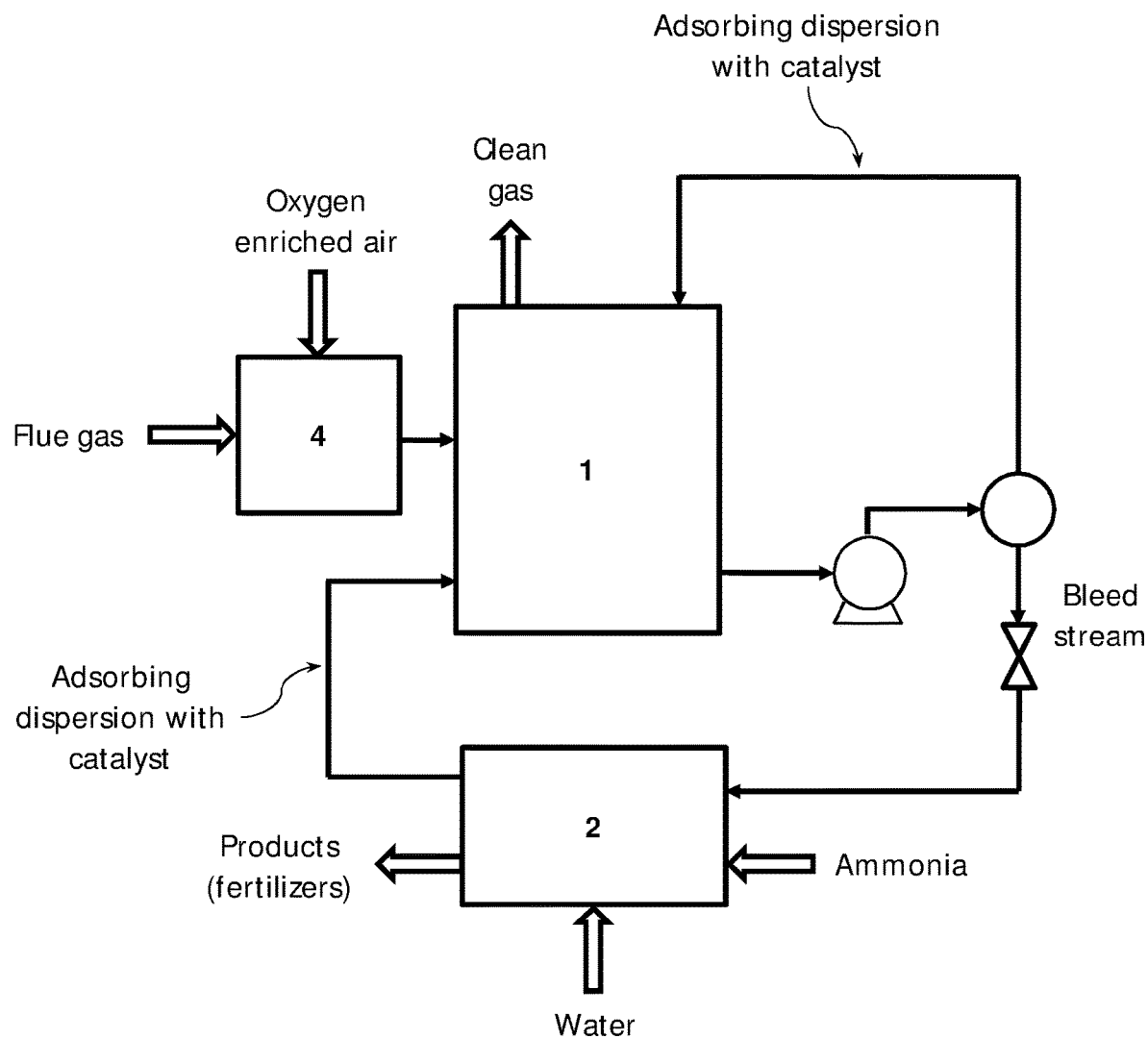
FIG. 5 shows the operational diagram of the industrial two-stage system of the present invention with the separate oxidation chamber (4) containing the oxidation catalyst.

In a further embodiment, the combined system of the present invention further comprises a separate oxidation column (or chamber) connected to the air separation unit and arranged to receive the air stream substantially enriched with atmospheric oxygen and a stream of flue gases containing $NO_x$ and $SO_x$, said oxidation column filled with an oxidation catalyst and capable of carrying out the catalytic oxidation of $NO_x$ and $SO_x$ by said oxygen. Reference is now made to FIG. 5 demonstrating the operational diagram of the industrial two-stage system of the present invention having a separate oxidation chamber (4) containing the oxidation catalyst for receiving the air stream substantially enriched with atmospheric oxygen and a flue gas stream containing $NO_x$ and $SO_x$ and carrying out the oxidation reaction of $NO_x$ and $SO_x$ with said oxidation catalyst, and a wet scrubber (1), which is essentially the same adsorption and oxidation reactor (1) shown in FIG. 1 for the one-stage system of the present invention.

The wet scrubber (1) contains an adsorbing dispersion, receives the streams of the air and flue gas containing the oxidised $NO_x$ and $SO_x$, adsorbs the streamed gases into said adsorbing dispersion and then carries out the wet scrubbing of said gases. The adsorbing dispersion in this case is recycled in the system the same way as explained above for the one-stage configuration and therefore may contain the oxidation catalyst capable of completing the oxidation reaction of $NO_x$ and $SO_x$ partially pre-oxidised in the oxidation chamber (4), if necessary.

Figure 6:
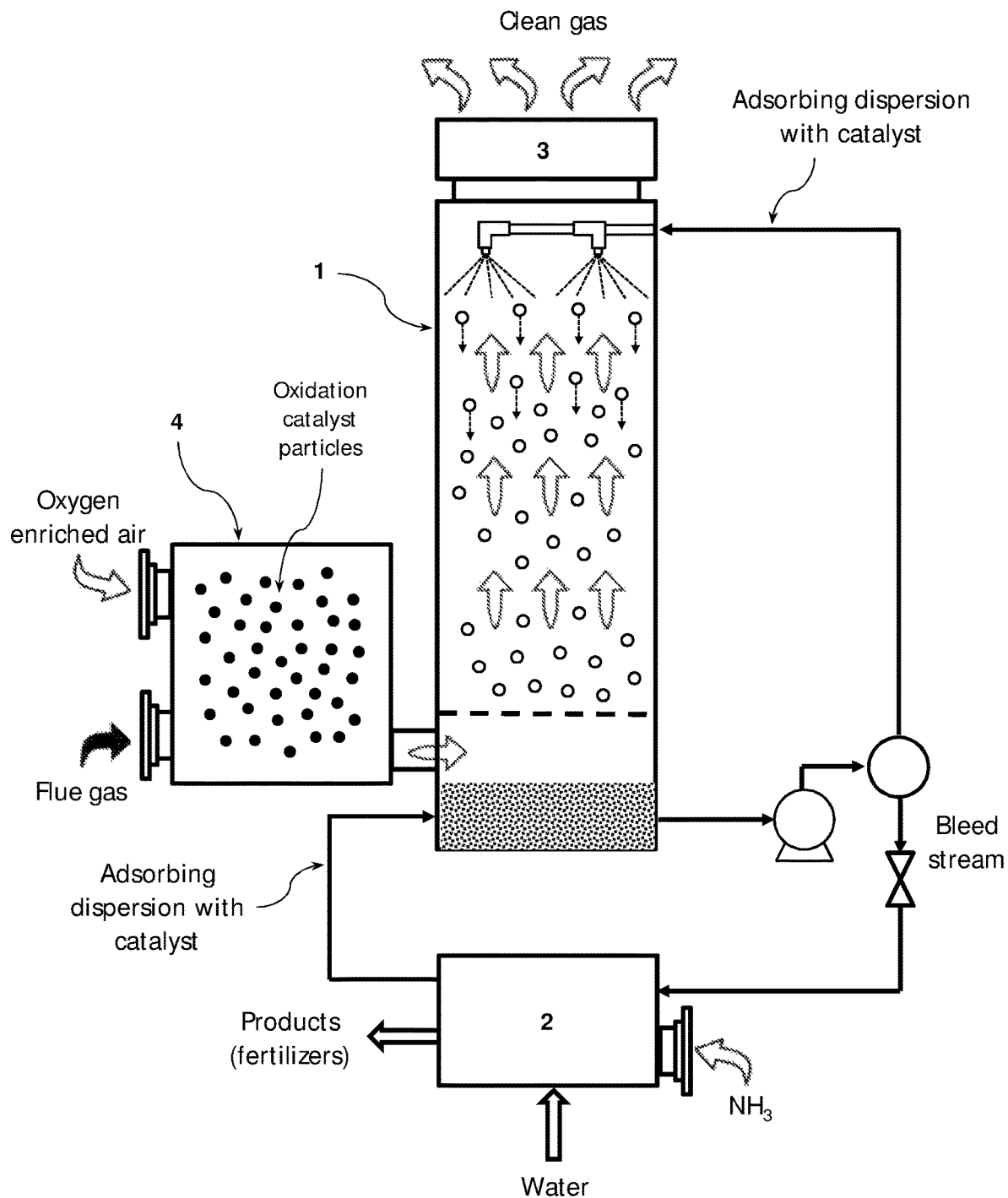
FIG. 6 schematically shows the two-stage system of the present invention, wherein the wet scrubber (1) is a spray tower that is capable of spraying the adsorbing dispersion.

FIG. 6 schematically shows the two-stage system of the present embodiment, wherein the wet scrubber (1) is a spray tower that is capable of spraying the adsorbing dispersion. The oxidation chamber (4) is connected to the air separation unit (not shown here) to receive the air stream highly enriched with atmospheric oxygen and the stream of a flue gas containing $NO_x$ and $SO_x$. The oxidation chamber (1) may be either dry, packed with inert solids, such as ceramic beads, promoting a better contact between said oxygen stream and said flue gas stream, or wet with a liquid circulating inside. Consequently, the oxidation chamber (4) is filled with either dry or wet oxidation catalyst particles and capable of carrying out the catalytic oxidation of $NO_x$ and $SO_x$ by said oxygen. The oxidation chamber (4) may then be refilled with fresh water or with water recycled from the mother liquor left after precipitation or crystallisation of the fertiliser products.

As shown in FIG. 6, the inlet gas stream containing oxidised $NO_x$ and $SO_x$ enters from the dry oxidation chamber (4) at the bottom of the spray tower and moves (flows) upward counter current to the adsorbing dispersion, which is sprayed downward from one or more nozzles. Thus, in the two-stage system shown in FIGS. 5 and 6 may actually be transformed into a one-stage system, when the oxidation chamber (4) and spray tower (1) are combined together or the oxidation chamber is incorporated into the spray tower.

Figure 7:
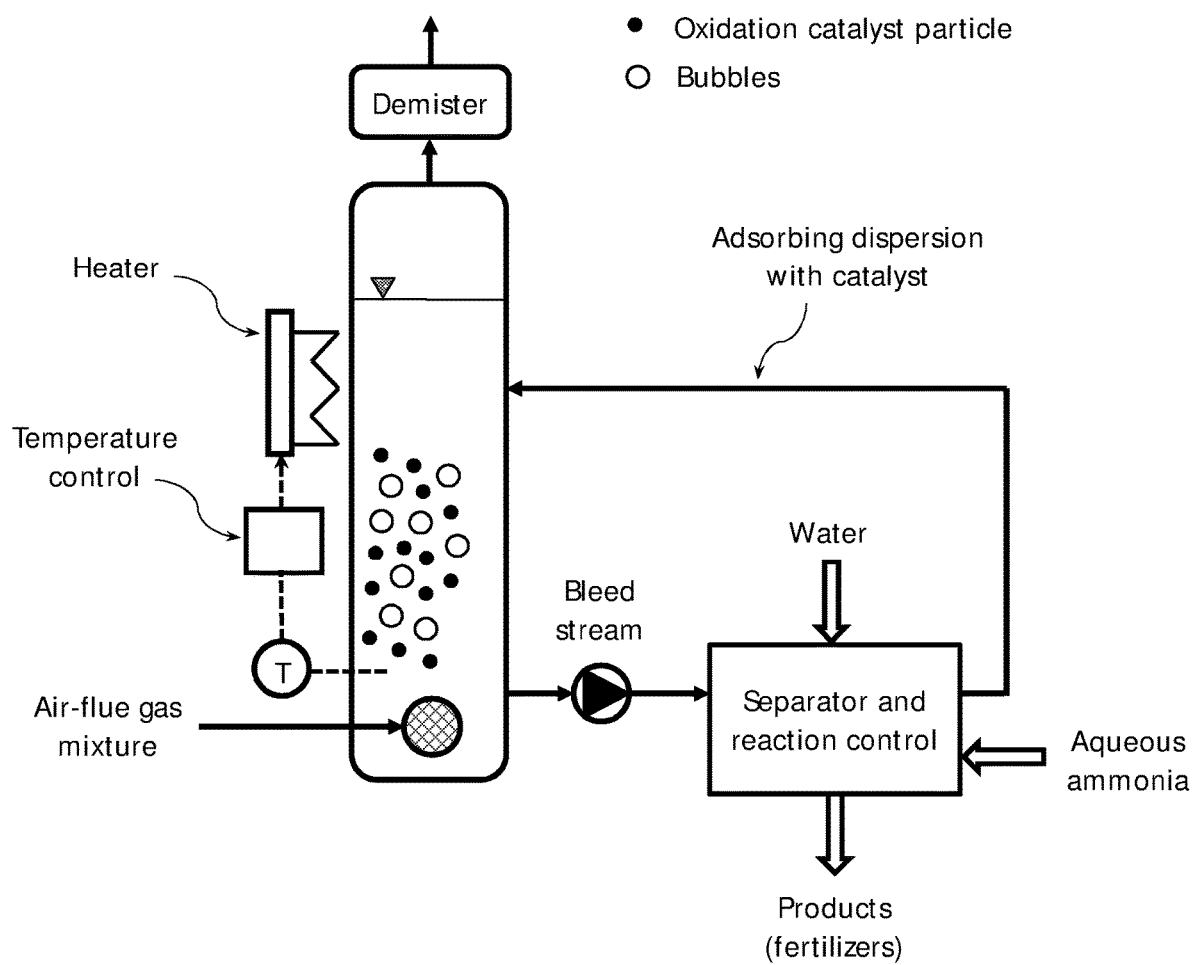
FIGS. 7 and 8 schematically show the corresponding one- and two-stage laboratory systems of the present invention shown in FIGS. 2 and 6, respectively.
Figure 8:
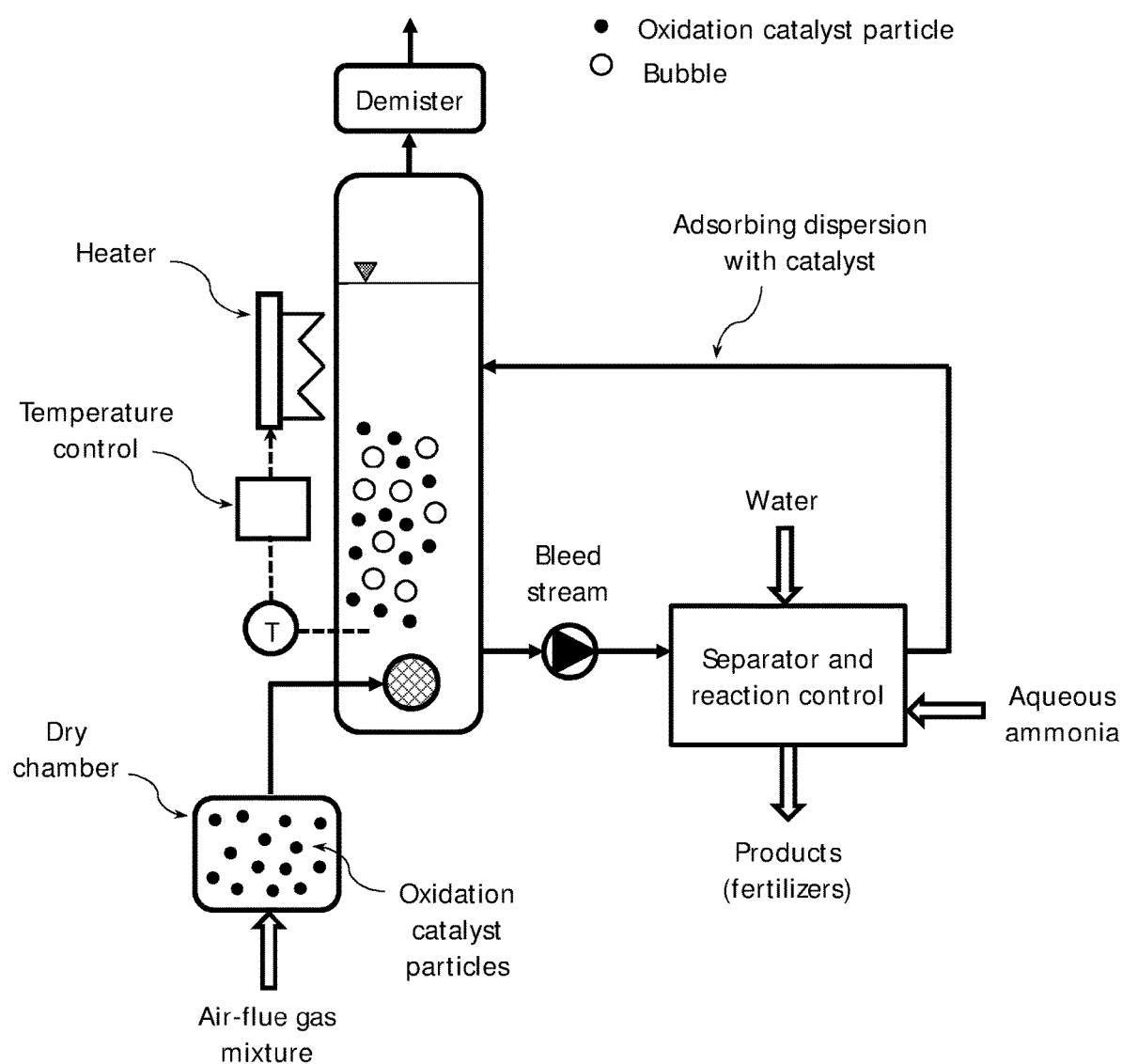
Figure 9:
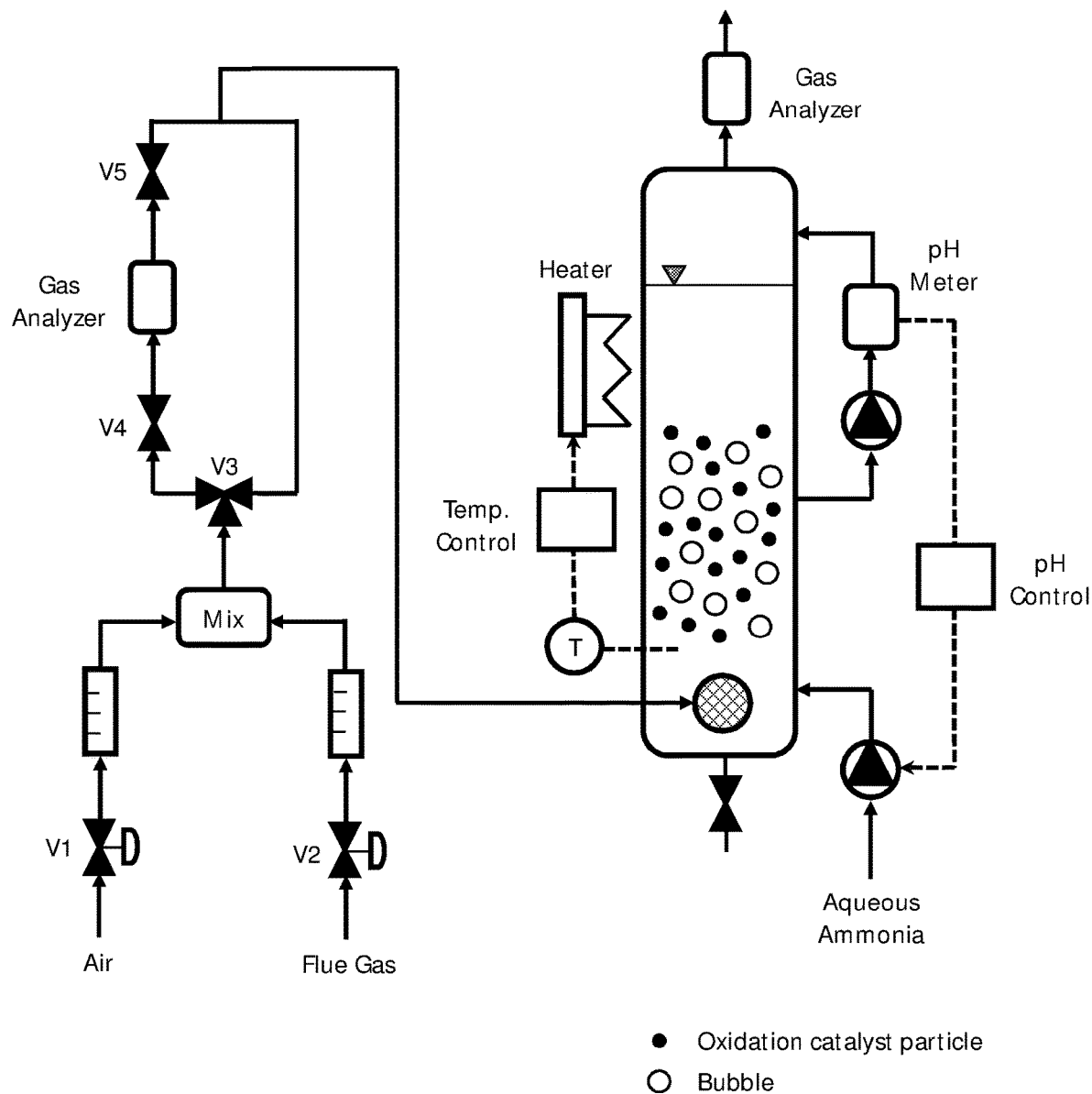
FIG. 9 schematically shows the operational diagram of the one-stage laboratory system of the present invention fed with synthetic gases.
Figure 10:
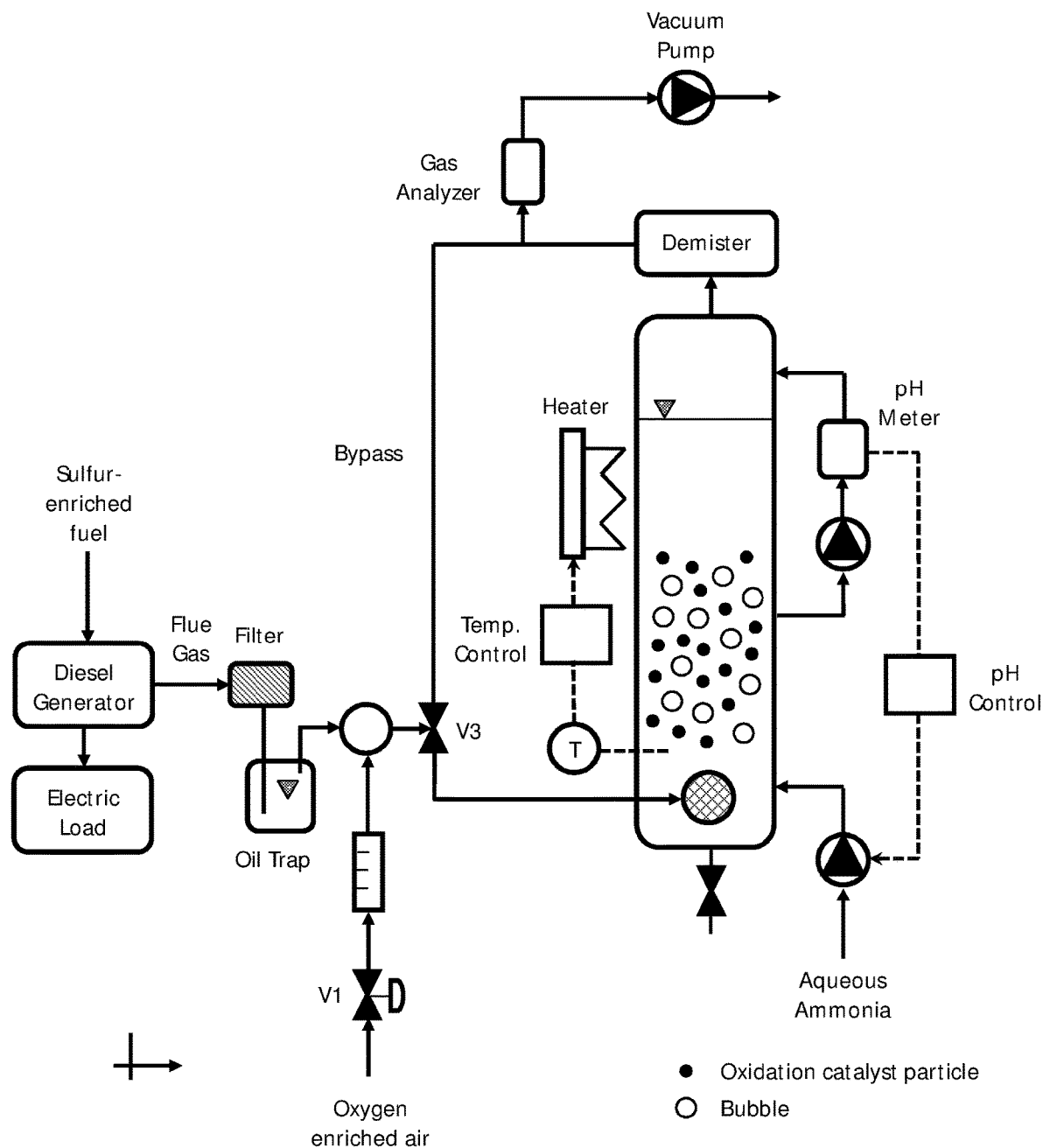
FIG. 10 schematically shows the operational diagram of the one-stage laboratory system of the present invention fed with the fuel gases from a diesel engine.

FIGS. 7 and 8 schematically show the corresponding one- and two-stage laboratory systems of the present invention shown in FIGS. 2 and 6, respectively, and described above. Further, FIG. 9 schematically shows the operational diagram of the one-stage laboratory system fed with synthetic gases, while FIG. 10 schematically shows the operational diagram of the one-stage laboratory system fed with the fuel gases from a diesel engine.

In another embodiment, a process of removing simultaneously nitrogen and sulphur oxides ($NO_x$ and $SO_x$) from flue gases containing said oxides and manufacturing fertilisers comprises:

I. Separating atmospheric oxygen from air, thereby producing an air stream substantially enriched with atmospheric oxygen for oxidation of $NO_x$ and $SO_x$;

II. Catalytic oxidation of the $NO_x$ and $SO_x$ contained in the flue gases by the atmospheric oxygen in said air stream, thereby producing the oxidised $NO_x$ and $SO_x$ streamed with the flue gases;

III. Wet-scrubbing of the oxidised $NO_x$ and $SO_x$ streamed with the flue gases with an adsorbing dispersion comprising either a solid catalyst suspended in water, or a catalyst soluble in organic solvent and emulsified in water, or their combination (the solid catalyst suspended in water and the catalyst soluble in organic solvent and emulsified in water), thereby removing the $NO_x$ and $SO_x$ from the flue gases; and IV. Subjecting the adsorbing dispersion comprising the oxidised $NO_x$ and $SO_x$ to reaction with ammonia, thereby producing ammonium nitrate and ammonium sulphate fertilisers.

The combined system of the embodiment is thus built to replace the existing bulky and expensive wet scrubbing systems operating at a relatively high temperature (more than 350° C.) with much smaller, simpler and cheaper combination systems operating at 50-90° C. Another important feature of the present invention is that the process for oxidation of $NO_x$ and $SO_x$ in flue gases is a simple, economic process providing a general method for manufacturing fertilisers, such as ammonium nitrate ($NH_4NO_3$) and ammonium sulphate (($NH_4)_2SO_4$), by ammonia injection to the oxidised $NO_x$ and $SO_x$ gases.

The combined system of the embodiment and the process carried out therein allow the replacement of the present expensive clean fossil fuels (purified according to environmental regulations and used in power production) with relatively much cheaper nitrogen and sulphur contaminated fossil fuels, which may not be used because of their hazardous effect on the environment. Also, the possibility of combined treatment for different types of pollutants at the same facility is of great operational and economic advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A combined system for catalytic oxidation and wet-scrubbing of simultaneously both nitrogen oxides ($NO_x$) and sulphur oxides ($SO_x$) from a flue gas, and for manufacturing fertilisers comprising:
   a) An air separation unit for separating atmospheric oxygen from air and thereby producing an air stream substantially enriched with atmospheric oxygen for oxidation of $NO_x$ and $SO_x$;
   b) An adsorption and oxidation reactor containing a dry oxidation catalyst or an adsorbing dispersion containing the oxidation catalyst, and designed to receive the air stream substantially enriched with atmospheric oxygen and a flue gas stream containing $NO_x$ and $SO_x$, to adsorb said streamed gases, and then to carry out the catalytic oxidation of said $NO_x$ and $SO_x$ by said oxygen to yield nitric and sulphuric acids;
   c) A separator and reactor control unit for separation of products and liquids and controlling said catalytic oxidation and wet-scrubbing; and
   d) A vessel containing gas or liquid ammonia, connected to said adsorption and oxidation reactor or to said separator and reactor control unit, and having an inlet streaming said ammonia into the adsorption and oxidation reactor or into the separator and reactor control unit to react with the nitric and sulphuric acids and to yield ammonium nitrate and ammonium sulphate fertilisers, thereby wet-scrubbing $NO_x$ and $SO_x$ from the flue gas and producing said fertilisers.

2. The system of claim 1, wherein said adsorption and oxidation reactor is dry and packed with inert solids promoting a better contact between said oxygen stream and said flue gas stream.

3. The system of claim 1, wherein said adsorption and oxidation reactor is wet containing a liquid circulating inside.

4. The system of claim 1, wherein said adsorption and oxidation reactor is selected from a bubble column, packed bed and spray tower.

5. The system of claim 4, wherein said adsorption and oxidation reactor is a spray tower equipped with spray means capable of spraying into said spray tower: (i) water or mother liquor onto the dry oxidation catalyst particles, thereby forming floating drops of the adsorbing dispersion directly inside the spray tower, or (ii) the adsorbing dispersion prepared in advance and comprising the oxidation catalyst particles.

6. The system of claim 5, wherein said spray means comprise one or more spray nozzles arrayed within the spray tower along the flue gas flow path and configured to spray said water, mother liquor or adsorbing dispersion into the vessel.

7. The system of claim 1, wherein said adsorbing dispersion is an aqueous suspension of the oxidation catalyst particles.

8. The system of claim 7, wherein said oxidation catalyst comprises the mixture of an aqueous solution of a metal salt precursor with silica gel particles and used for catalysing the oxidation reaction of $NO_x$ and $SO_x$ in the flue gas.

9. The system of claim 8, wherein the metal salt precursor is a water-soluble inorganic salt of a transition metal selected from cobalt (Co), nickel (Ni), manganese (Mn), iron (Fe), copper (Cu) and chromium (Cr).

10. The system of claim 9, wherein the metal salt precursor is cobalt chloride ($CoCl_2$), and the oxidation catalyst comprises an aqueous suspension of cobalt oxide/hydroxide particles supported on silica gel particles.

11. The system of claim 1, wherein said separator and reactor control unit comprises at least one of the following processing units: a phase separator, crossflow separator, mixer-settler, decanter, tricanter or filter.

12. The system of claim 11, further comprising a crystallisation vessel connected to the processing unit and configured to receive from said processing unit an aqueous solution containing the dissolved ammonium nitrate and ammonium sulphate products, said crystallisation vessel is capable of crystallising and precipitating the ammonium nitrate and ammonium sulphate from the aqueous solution.

13. The system of claim 1, wherein said adsorbing dispersion is an oil-water emulsion, and said separator and reactor control unit comprises an oil-water phase separator configured to receive said oil-water emulsion from the adsorption and oxidation reactor and to separate gross amounts of oil (organic phase) from water (aqueous phase).

14. The system of claim 13, wherein the oil-water emulsion comprises a filtered aqueous solution and an organic phase, said organic phase comprises elemental sulphur in saturated heavy mineral oil, said sulphur is capable of catalysing the oxidation reaction of $NO_x$ and $SO_x$ in the flue gas.

15. The system of claim 14, wherein said organic phase further comprises activators added to the sulphur oil solution to increase solubility of the elemental sulphur.

16. The system of claim 1, further comprising a separate oxidation chamber connected to the air separation unit and configured to receive the air stream substantially enriched with atmospheric oxygen and a stream of the flue gas containing $NO_x$ and $SO_x$, said oxidation chamber is filled with the oxidation catalyst capable of catalysing oxidation of $NO_x$ and $SO_x$ by said atmospheric oxygen.

17. The system of claim 16, wherein said oxidation chamber is dry and packed with inert solids promoting a better contact between said oxygen stream and said flue gas stream, or said oxidation chamber is wet containing a liquid circulating inside.

18. A process of removing simultaneously nitrogen and sulphur oxides from a flue gas containing said oxides, said process comprises:
   I. Separating atmospheric oxygen from air, thereby producing an air stream substantially enriched with atmospheric oxygen for oxidation of $NO_x$ and $SO_x$;
   II. Catalytic oxidation of the $NO_x$ and $SO_x$ contained in the flue gas by the atmospheric oxygen in said air stream, thereby producing the oxidised NON and SON streamed with the flue gas; and
   III. Wet-scrubbing of the oxidised $NO_x$ and $SO_x$ streamed in the flue gas with an adsorbing dispersion comprising a solid oxidation catalyst suspended in water, an oxidation catalyst soluble in organic solvent and emulsified in water, or combination thereof, thereby removing the $NO_x$ and $SO_x$ from the flue gas.

19. The process of claim 18, further comprising the steps of contacting the oxidised $NO_x$ and $SO_x$ dissolved in said adsorbing dispersion with ammonia to produce ammonium nitrate ($NH_4NO_3$) and ammonium sulphate (($NH_4)_2SO_4$), separating, crystallising end collecting said $NH_4NO_3$ and $(NH_4)_2SO_4$ and recycling water from mother liquor, said mother liquor is left after precipitation of said $NH_4NO_3$ and $(NH_4)_2SO_4$.

20. The process of claim 18, wherein said process is carried out at the temperature of 50-90° C. and pH 4-7.

\* \* \* \* \*